United States Patent Office 3,202,642

Patented Aug. 24, 1965

3,202,642

HOMOPOLYMERS AND COPOLYMERS OF ISOPROPENYLNAPHTHALENES AND PROCESSES OF PRODUCING THE SAME

George F. Hardy, Drexel Hill, Pa., assignor to Allied Chemical Corporation, New York, N.Y., a corporation of New York No Drawing. Filed Feb. 27, 1961, Ser. No. 91,645
15 Claims. (Cl. 260—85.5)

This invention relates to homopolymers and copolymers of isopropenylnaphthalenes and to processes of producing the same.

It is well-known that isopropenylnaphthalenes do not polymerize readily, and that under the extreme conditions required to effect polymerization, low molecular weight polymers are obtained. These polymers have low softening temperature, resistance to solvents and mechanical strength and are completely unsuitable as molding compounds.

An object of this invention is to provide homopolymers and copolymers of isopropenylnaphthalenes having molecular weights of at least 10,000.

Another object of this invention is to provide processes for the production of homopolymers and copolymers of isopropenylnaphthalenes having molecular weights of at least 10,000.

Other objects and advantages of the invention will be apparent to those skilled in the art from the following description and examples.

In accordance with one embodiment of the present invention, homopolymers and copolymers of isopropenylnaphthalenes may be obtained by polymerizing an isopropenylnaphthalene, alone or in admixture with a comonomer capable of being polymerized by alkali metal catalysis, in the presence of (1) a catalyst selected from the group consisting of alkali metals, alkali metal hydrides, alkali metal alkyls, alkali metal aryls and addition compounds of alkali metals with polynuclear aromatic compounds and (2) an inert organic diluent, and recovering polymer from the resulting polymerization mass.

By polymerizing under the above operating conditions, homopolymers and copolymers having molecular weights of at least 10,000, i.e. 10,000 to 100,000, or even higher, are obtained. These polymers exhibit good mechanical strength, stiffness and hardness, as well as good heat and solvent resistance. Such properties make the polymers ideally suited as molding compounds.

Any isopropenylnaphthalene compound may be employed as monomer in the alkali metal catalytic process of this invention, including 2-isopropenylnaphthalene, 1-isopropenylnaphthalene and di-isopropenylnaphthalene. Other suitable isopropenylnaphthalene monomers include alkyl isopropenylnaphthalenes such as methyl isopropenylnaphthalene, etc.

In the production of copolymers, the comonomer may be any unsaturated organic compound capable of being itself polymerized by alkali metal catalysis. Included in this class of monomers are vinyl aromatic compounds such as styrene, alpha-methyl styrene, etc., dienes such as butadiene, isoprene, etc., vinyl naphthalene and similar derivatives thereof, esters of saturated alcohols with mono- and polybasic unsaturated acids such as methyl acrylate, methyl methacrylate, etc., unsaturated nitriles such as acrylonitrile, methacrylonitrile, etc.

The catalysts employed are selected from the class consisting of alkali metals (e.g. sodium, lithium or potassium), their hydrides, alkyls (e.g. amyl sodium or butyl lithium), aryls (e.g. phenyl sodium) and addition compounds of the alkali metals with polynuclear aromatic hydrocarbons such as naphthalene. Of the alkali metals potassium, and particularly sodium, are preferred. The activity of these catalysts is proportional to their surface area. Hence, it is desirable to employ them in finely divided form.

The alkali metal catalyst may be prepared in finely divided form by dispersing it in conventional manner in an inert liquid such as petrolatum, light mineral oil, toluene, heptane, etc. If desired, a dispersing agent which aids in the preparation of such catalyst may be employed.

Although the amount of the catalyst used is to some extent dependent upon its state of particle size, concentrations of about 0.01 to 5%, preferably about 0.05 to 1%, by weight of the monomer material are normally adequate to effect the desired polymerization reaction.

The alkali metal-catalyzed reaction is generally conducted in the presence of an organic diluent which is a solvent for the monomer material but is inert in the reaction. Suitable diluents include aliphatic and aromatic hydrocarbons such as heptane, benzene, cyclohexane, etc., as well as ethers such as diethyl ether, tetrahydrofuran, ethylene glycol dimethyl ether, etc.

Relatively low weight ratio of diluent to monomer material is generally employed. However, when less than about 1 part of diluent per part of monomer material is employed, special agitation is necessary because of the thickness of the polymerization mass. Preferably about 1 to 3 parts of diluent per part of monomer material is used.

In the production of copolymers of isopropenylnaphthalene, the reaction may be conducted without an added diluent if the isopropenylnaphthalene is soluble in the comonomer employed. For example, isopropenylnaphthalene is soluble in styrene and, hence, may be copolymerized therewith in the absence of an added diluent.

The alkali metal-catalyzed reaction may be accelerated by the addition of certain ethers to the polymerization mixture as activators. These activators include alkyl monoethers containing at least one methyl group, dialkyl ethers of ethylene glycol, dialkyl ethers of polyethylene glycols and tetrahydrofuran. Alkyl groups other than methyl in the alkyl monoethers contain preferably from 2 to 4 carbon atoms. In the case of the dialkyl ethers of ethylene glycol and polyethylene glycols, the alkyl groups contain preferably from 1 to 4 carbon atoms.

Typical examples of the alkyl monoethers are dimethyl ether and methyl ethyl ether. Typical examples of the dialkyl ethers of ethylene glycol and polyethylene glycols are ethylene glycol dimethyl ether, ethylene glycol diethyl ether and diethylene glycol dimethyl ether.

While the activating ether may be used as the reaction diluent, it is preferable to employ a small amount of the ether in conjunction with another diluent. Generally speaking, about 1 to 5% by weight of the ether based on the monomer material is sufficient to obtain the desired result.

The reaction temperature employed is generally below about 10° C. and may be down to −80° C. or even below. In the copolymerization reactions the temperature may, however, be as high as about 100° C. Preferably the polymerization temperature is maintained within the range of about −10° to 10° C. Although longer reaction times may be used, substantially complete reaction may be attained in reaction times of about 1 to 5 hours.

If the polymer produced is insoluble in the reaction diluent, agitation must be maintained during the reaction to keep the polymer in dispersed form. In addition, a dispersing agent may be incorporated in the polymerization mixture. Although any dispersing agent which is inert in the reaction may be employed, it is preferred to use relatively high molecular weight fatty acids or their salts. Among the suitable dispersing agents are oleic acid, stearic acid, sodium stearate, aluminum stearate and octadecyl alcohol. When the free acids are used, they must be converted to salts by contact with the catalyst before reaction is initiated in order to avoid terminating the reaction.

Generally speaking, the amount of dispersing agent used is about 0.5 to 5%, preferably about 1 to 3%, by weight of the monomer material. Use of a dipsersing agent may be dispensed with if carefully controlled agitation is employed to attain the desired dispersion.

After the reaction is complete, the reaction may be terminated by adding an alcohol, preferably a monohydric alcohol such as methanol, ethanol or isopropanol. Use of alcohols is advantageous since they destroy the catalyst, soak up residual monomers and dissolve salts and dispersing agents. The polymer is then filtered, washed with additional alcohol and finally dried at temperature of about 20° to 100° C. Other terminating agents include air, water, alkyl halides, carbon dioxide, etc.

Generally speaking, the alkali metal-catalyzed process of this invention enables the obtainment of homopolymers and copolymers of isopropenylnaphthalenes having reduced viscosities of at least about 0.1 and usually 0.5 or higher. Such reduced viscosities correspond to molecular weights of 10,000 or greater.

According to another embodiment of this invention, copolymers of isopropenylnaphthalenes may be prepared by polymerizing monomer material in the presence of a free radical-generating catalyst. This reaction may be carried out in suspension, emulsion or mass systems.

Any isopropenylnaphthalene, such as those listed above, may be employed in the free radical-catalyzed process of this invention. The comonomer may be any ethylenically unsaturated compound. Typical examples of comonomers include esters of saturated alcohols with mono- and poly-basic unsaturated acids such as methyl acrylate, methyl methacrylate, etc., unsaturated nitriles such as acrylonitrile, methacrylonitrile, etc., dienes such as butadeine, isoprene, etc., vinyl aromatic compounds such as styrene, alpha-methyl styrene, etc., vinyl halides such as vinyl chloride, vinylidine chloride, etc.

Any free radical-generating catalyst may be employed in the polymerization reaction. Preferably the catalyst is a water-soluble inorganic peroxy compound such as sodium persulfate, potassium persulfate, hydrogen peroxide, etc. Other suitable free radical-generating catalysts include benzoyl peroxide, azo-bis-isobutyronitrile, cumene hydroperoxide, etc.

The free radical-generating catalyst is generally present in ratio of about 0.1 to 5 parts by weight, preferably about 0.5 to 2 parts, per 100 parts of monomer material.

An emulsion system is preferred in carrying out this polymerization reaction. Such system contains a water-soluble inorganic peroxy compound and in some instances a reductant such as sodium bisulfite, potassium bisulfite, sodium formaldehyde sulfoxylate, etc. The reductant generally comprises about 0.05 to 1 part by weight per 100 parts of monomer material.

Examples of suitable emulsifying agents are alkali metal salts of sulfonated or sulfated long-chain hydrocarbons and water-soluble salts of sulfuric acid esters of fatty alcohols. Specific examples include sodium heptadecyl sulfate, sodium lauryl sulfate, esters of sulfosuccinic acid, etc.

A modifier which assists in promoting the polymerization reaction may also be used in the emulsion system. Suitable modifiers are sulfur-containing compounds such as higher alkyl mercaptans. Specific examples include t-dodecyl mercaptan, etc.

It is sometimes necessary to maintain the pH of the system by the addition of suitable buffering agents. The desired pH will depend on the choice of catalyst and emulsifier and may be determined in ways well known to those skilled in the art.

The temperature at which the polymerization reaction is carried out depends upon the type of catalyst which is used. With water-soluble inorganic peroxy catalysts the reaction is preferably carried out at temperature of about 50° to 100° C. If a reductant is used in conjunction with the peroxy catalyst, temperature of about 30° to 80° C. is preferably employed. The reaction time may be between about 6 hours and 6 days, with a time of about 7 to 70 hours being preferred.

As in the case of the alkali metal-catalyzed process, the copolymers produced by the free radical-catalyzed process have molecular weights of at least 10,000, exhibit good mechanical strength, stiffness and hardness, as well as good heat and solvent resistance, and may be used as molding compounds.

The following examples illustrate practice of the invention but are not to be construed as limiting the scope thereof. In the examples, parts are by weight.

*Example 1*

A glass reactor was equipped with a stirrer and a nitrogen blanket. 40 parts of 2-isopropenylnaphthalene, 66 parts of benzene and 3.4 parts of n-heptane were charged to the reactor. The reactor contents were cooled to about 3° C., and 1.7 parts of 1,2-dimethoxyethane were added, followed by 0.03 part of sodium finely dispersed in a mixture of mineral oil and toluene.

The sodium dispersion was prepared by subjecting a mixture of 100 parts of finely divided sodium, 233 parts of mineral oil and 1.6 parts of oleic acid to high-speed agitation at 100–110° C. The dispersion was diluted with an equal volume of toluene before use.

After 135 minutes, 396 parts of methanol were added, and the resulting precipitated polymer was broken up, washed with additional methanol, dried, washed with acetone and redried under vacuum. There were obtained 35 parts of 2-isopropenylnaphthalene homopolymer. The reduced viscosity of the homopolymer (1 gram/100 cc. in toluene at 25° C.) was 0.44 (corresponding to a molecular weight of about 100,000). Conversion to polymer was 87.5% based on the 2-isopropenylnaphthalene fed.

The 2-isopropenylnaphthalene homopolymer softened at 250–280° C. A disc prepared by compression-molding was clear, hard and stiff and was not visibly affected by 6 hours immersion in acetone.

*Example 2*

Using the apparatus employed in Example 1, 68 parts of n-heptane, 1.34 parts of oleic acid, 1.2 parts of sodium finely dispersed in mineral oil and 0.43 part of 1,2-dimethoxyethane were charged to the reactor.

The sodium dispersion was prepared by subjecting a mixture of 100 parts of finely divided sodium, 233 parts of mineral oil and 1.6 parts of oleic acid to high-speed agitation at 100–110° C.

The reactor contents were cooled to 3–4° C., and during the next 210 minutes a mixture of 40 parts of styrene and 40 parts of 2-isopropenylnaphthalene were added in dropwise manner. 27 parts of n-heptane were also added at 180 minutes.

396 parts of methanol were then added, and the resulting precipitated copolymer was filtered off, washed with methanol and dried at 75° C. The dried product comprising a copolymer of 2-isopropenylnaphthalene and styrene constituted 49.2 parts. The reduced viscosity of the copolymer (1 gram/100 cc. in toluene at 25° C.) was 0.60 (corresponding to a molecular weight of about 100,000).

The infrared absorption spectrum of the copolymer showed its weight composition to be approximately 72% styrene and 28% 2-isopropenylnaphthalene. Conversion to copolymer was 62.5% based on the monomers fed.

A compression-molded disc of the copolymer was not visibly warped after one hour immersion in boiling water.

*Example 3*

About 250 parts of de-ionized water, 7.5 parts of 2-isopropenylnaphthalene, 45 parts of methyl methacrylate, 5.2 parts of Tergitol Anionic 7 (an emulsifying agent comprising sodium heptadecyl sulfate), 0.13 part of t-dodecyl mercaptan and 0.5 part of potassium persulfate were charged to a metal reaction tube and were reacted in the absence of air for 67 hours at 60° C. with continuous agitation by tumbling.

The resulting polymer emulsion was frozen in a Dry-Ice bath, thawed and filtered. The polymerization product was washed with water and then with methanol and dried at 75° C. The dried product constituted 31 parts of copolymer of 2-isopropenylnaphthalene and methyl methacrylate. The reduced viscosity of the copolymer (1 gram/100 cc. in methyl ethyl ketone at 25° C.) was 0.21 (corresponding to a molecular weight of about 100,000), and its 2-isopropenylnaphthalene content was 17 weight percent. Conversion to copolymer was about 59% based on the monomers fed.

The 2-isopropenylnaphthalene-methyl methacrylate copolymer was compression-molded into a clear, strong colorless disc at 175° C. It was unaffected by 18 hours immersion in toluene.

*Example 4*

About 250 parts of de-ionized water, 60 parts of 2-isopropenylnaphthalene, 20 parts of acrylonitrile, 10.5 parts of Tergitol Anionic 7, 2 parts of 0.1 normal sulfuric acid, 0.05 part of sodium bisulfite and 0.5 part of potassium persulfate were charged into a metal reaction tube and were reacted in the absence of air for 67.5 hours at 60° C. with continuous agitation by tumbling. The resulting polymer emulsion was frozen in a Dry-Ice bath, thawed and filtered. The polymerization product was washed with water and then with methanol and finally dried at 75° C. The dried product comprising a copolymer of 2-isopropenylnaphthalene and acrylonitrile constituted 67 parts. The copolymer had a reduced viscosity (1 gram/100 cc. in dimethyl formamide at 25° C.) of 0.46 (corresponding to a molecular weight of about 50,000). Conversion to copolymer based on the monomers fed was about 84%.

The copolymer was compression molded into a clear, strong, light yellow disc at 215° C.

While the preferred embodiments for carrying out this invention have been described, it will be apparent that many changes may be made without departing from the spirit of the invention. For example, the processes described above may be carried out in continuous as well as batch manner.

I claim:

1. A polymer selected from the group consisting of homopolymers of an isopropenylnaphthalene and copolymers of an isopropenylnaphthalene and an ethylenically unsaturated compound, said polymer having a molecular weight of at least 10,000 and being suiable for use as a molding compound, prepared by a process which comprises polymerizing a monomer material selected from the group consisting of a monomer of an isopropenylnaphthalene and a monomer mixture of an isopropenylnaphthalene and an ethylenically unsaturated compound in the presence of a catalyst selected from the group consisting of alkali metals, alkali metal hydrides, alkali metal alkyls, alkali metal aryls and addition compounds of alkali metals with polynuclear aromatic hydrocarbons in amount about 0.01 to 5% by weight of the monomer, and recovering the polymer from the resulting polymerization mass.

2. A homopolymer of an isopropenylnaphthalene having a molecular weight of at least 10,000 and being suitable for use as a molding compound prepared by a process which comprises polymerizing an isopropenylnaphthalene monomer in the presence of (1) a catalyst selected from the group consisting of alkali metals, alkali metal hydrides, alkali metal alkyls, alkali metal aryls and addition compounds of alkali metals with polynuclear aromatic hydrocarbons in amount about 0.01 to 5% by weight of the monomer, and (2) an inert organic solvent, and recovering the isopropenylnaphthalene homopolymer from the resulting polymerization mass.

3. 2-isopropenylnaphthalene homopolymer having a molecular weight of at least 10,000 and being suitable for use as a molding compound prepared by the process of claim 2.

4. A copolymer of an isopropenylnaphthalene and an ethylenically unsaturated compound, said copolymer having a molecular weight of at least 10,000 and being suitable for use as a molding compound, prepared by a process selected from the group consisting of (A) polymerizing a monomer mixture of an isopropenylnaphthalene and an ethylenically unsaturated compound in the presence of a catalyst selected from the group consisting of alkali metals, alkali metal hydrides, alkali metal alkyls, alkali metal aryls and addition compounds of alkali metals with polynuclear aromatic hydrocarbons in amount about 0.01 to 5% by weight of the monomer mixture, and recovering the copolymer from the resulting polymerization mass, and (B) polymerizing a monomer mixture of an isopropenylnaphthalene and an ethylenically unsaturated compound in the presence of a free radical-generating catalyst in amount about 0.1 to 5% by weight of the monomer mixture, and recovering the copolymer from the resulting polymerization mass.

5. A copolymer of 2-isopropenylnaphthalene and styrene, said copolymer having a molecuar weight of at least 10,000 and being suitable for use as a molding compound, prepared as set forth in claim 4.

6. A copolymer of 2-isopropenylnaphthalene and methyl methacrylate, said copolymer having a molecular weight of at least 10,000 and being suitable for use as a molding compound, prepared as set forth in claim 4.

7. A copolymer of 2-isopropenylnaphthalene and acrylonitrile, said copolymer having a molecular weight of at least 10,000 and being suitable for use as a molding compound, prepared as set forth in claim 4.

8. A process which comprises polymerizing a monomer material selected from the group consisting of a monomer of an isopropenylnaphthalene and a monomer mixture of an isopropenylnaphthalene and an ethylenically unsaturated compound in the presence of (1) a catalyst selected from the group consisting of alkali metals, alkali metal hydrides, alkali metal alkyls, alkali metal aryls and addition compounds of alkali metals with polynuclear aromatic hydrocarbons in amount about 0.01 to 5% by weight of the monomer material and (2) an inert organic solvent, and recovering polymer having a molecular weight of at least 10,000 and being suitable for use as a molding compound from the resulting polymerization mass.

9. A process which comprises polymerizing an isopropenylnaphthalene monomer in the presence of (1) a catalyst selected from the group consisting of alkali metals, alkali metal hydrides, alkali metal alkyls, alkali metal aryls and addition compounds of alkali metals with polynuclear aromatic hydrocarbons in amount about 0.01 to 5% by weight of the monomer and (2) an inert organic solvent, and recovering isopropenylnaphthalene homopolymer having a molecular weight of at least 10,000 and being suitable for use as a molding compound from the resulting polymerization mass.

10. A process which comprises polymerizing a monomer mixture of an isopropenylnaphthalene and an ethylenically unsaturated compound in the presence of a catalyst selected from the group consisting of alkali metals, alkali metal hydrides, alkali metal alkyls, alkali metal aryls and addition compounds of alkali metals with polynuclear aromatic hydrocarbons in amount about 0.01 to 5% by weight of the monomer mixture, and recovering copolymer having a molecular weight of at least 10,000 and being suitable for use as a molding compound from the resulting polymerization mass.

11. The process of claim 9 carried out in the presence of a small amount of an ether selected from the group consisting of alkyl monoethers containing at least one methyl group, dialkyl ethers of ethylene glycol, dialkyl ethers of polyethylene glycols and tetrahydrofuran as accelerator.

12. The process of claim 10 carried out in the presence of an inert organic solvent.

13. The process of claim 12 carried out in the presence of a small amount of an ether selected from the group consisting of alkyl monoethers containing at least one methyl group, dialkyl ethers of ethylene glycol, dialkyl ethers of polyethylene glycols and tetrahydrofuran as accelerator.

14. A process which comprises polymerizing a monomer mixture of an isopropenylnaphthalene and an ethylenically unsaturated compound in the presence of a free radical-generating catalyst in amount about 0.01 to 5% by weight of the monomer mixture, and recovering copolymer having a molecular weight of at least 10,000 and being suitable for use as a molding compound from the resulting polymerization mass.

15. The process of claim 14 wherein the catalyst is a water-soluble inorganic peroxy compound.

References Cited by the Examiner

UNITED STATES PATENTS

| | | | |
|---|---|---|---|
| 2,476,737 | 7/49 | Kern et al. | 260—93.5 |
| 2,658,058 | 11/53 | Werkema | 260—93.5 |
| 2,899,418 | 8/59 | Reynolds | 260—93.5 |

OTHER REFERENCES

Bergmann et al.: Chem. Abs., vol. 39 (1945), pages 11563–11566.

Boundy et al.: Styrene—Its Polymers, Copolymers and Derivatives, Publishing Corporation (New York), 1952, pages 777–779.

Price et al.: J. Pol. Sci., vol. 11 (1953), pages 575–577.

Distiller Co., Chem. Abs., vol. 52 (1958), page 9668i.

Gaylord et al.: Linear and Stereoregular Addition Polymers, Interscience Publishers, Inc., New York (1959), p. 245.

Doak et al.: Am. Chem. Soc., Div. Polymer Chem., preprints 1, No. 1, 151–8 (1960).

JOSEPH L. SHOFER, *Primary Examiner.*

HAROLD N. BURSTEIN, JOSEPH R. LIBERMAN, DONALD E. CZAJA, LEON J. BERCOVITZ, *Examiners.*

UNITED STATES PATENT OFFICE

CERTIFICATE OF CORRECTION

Patent No. 3,202,642

August 24, 1965

George F. Hardy

It is hereby certified that error appears in the above numbered patent requiring correction and that the said Letters Patent should read as corrected below.

Column 5, line 57, for "suiable" read -- suitable --; column 7, line 22, for "0.01" read -- 0.1 --.

Signed and sealed this 8th day of March 1966.

(SEAL)
Attest:

ERNEST W. SWIDER
Attesting Officer

EDWARD J. BRENNER
Commissioner of Patents